(12) United States Patent
Johnson et al.

(10) Patent No.: US 12,060,229 B2
(45) Date of Patent: Aug. 13, 2024

(54) EXTENDABLE AND RETRACTABLE CONVEYOR

(71) Applicant: AG GROWTH INTERNATIONAL INC., Winnipeg (CA)

(72) Inventors: Zachary Johnson, Manitoba (CA); Tyler Camm, Saskatchewan (CA); Brandon Carruthers, Saskatchewan (CA)

(*) Notice: Subject to any disclaimer, the term of this patent is extended or adjusted under 35 U.S.C. 154(b) by 66 days.

(21) Appl. No.: 17/942,407

(22) Filed: Sep. 12, 2022

(65) Prior Publication Data

US 2023/0082889 A1 Mar. 16, 2023
US 2023/0294923 A2 Sep. 21, 2023

Related U.S. Application Data

(60) Provisional application No. 63/242,606, filed on Sep. 10, 2021.

(51) Int. Cl.
| | |
|---|---|
| *B65G 15/26* | (2006.01) |
| *A01D 41/12* | (2006.01) |
| *A01D 61/02* | (2006.01) |
| *B65G 21/14* | (2006.01) |
| *B65G 41/00* | (2006.01) |
| *B65G 47/18* | (2006.01) |

(52) U.S. Cl.
CPC ......... *B65G 15/26* (2013.01); *A01D 41/1217* (2013.01); *A01D 61/02* (2013.01); *B65G 21/14* (2013.01); *B65G 47/18* (2013.01); *B65G 41/003* (2013.01)

(58) Field of Classification Search
CPC ...... B65G 41/003; B65G 21/14; B65G 15/26; B65G 47/18; A01D 41/1217; A01D 61/02
USPC ........................................ 198/588, 594, 313
See application file for complete search history.

(56) References Cited

U.S. PATENT DOCUMENTS

| | | | |
|---|---|---|---|
| 3,168,946 A | 2/1965 | Gay | |
| 3,974,908 A * | 8/1976 | Keichinger | B65G 65/40 198/594 |

(Continued)

FOREIGN PATENT DOCUMENTS

| | | |
|---|---|---|
| CA | 2 398 015 A1 | 2/2004 |
| DE | 102017220148 A1 | 5/2019 |

OTHER PUBLICATIONS

English language Abstract of DE102017220148A1.

*Primary Examiner* — James R Bidwell
(74) *Attorney, Agent, or Firm* — Ware, Fressola, Maguire & Barber LLP

(57) ABSTRACT

An extendable and retractable conveyor includes a hopper for receiving agricultural product, and a housing having an inlet and an outlet that are separated by a fixed distance, the inlet being adjacent to the hopper for receiving the agricultural product from the hopper. The extendable and retractable conveyor also include a belt conveyor disposed within the housing for conveying the agricultural product from the inlet to the outlet, the conveyor defining a direction of conveyance; a hood connected to the outlet for deflecting the agricultural product relative to the direction of conveyance; and a movable spout that is slidably connected to a tube and disposed beneath the hood to receive the agricultural product from the hood, the movable spout being slidable in a direction parallel to the direction of conveyance to thereby extend or retract the conveyor.

28 Claims, 12 Drawing Sheets

(56) References Cited

U.S. PATENT DOCUMENTS

| | | | | |
|---|---|---|---|---|
| 4,591,432 | A * | 5/1986 | Hartl | B07B 13/18 |
| | | | | 198/313 |
| 7,946,416 | B2 | 5/2011 | Grose et al. | |
| 8,701,868 | B2 * | 4/2014 | Hall | A01C 15/006 |
| | | | | 198/581 |
| 10,023,389 | B1 * | 7/2018 | Priepke | A01D 43/087 |
| 10,906,744 | B2 * | 2/2021 | Grose | B65G 41/008 |
| 2012/0145517 | A1 | 6/2012 | Zazula et al. | |
| 2013/0048465 | A1 * | 2/2013 | Friesen | B65G 41/002 |
| | | | | 198/313 |
| 2015/0175356 | A1 | 6/2015 | Stenson et al. | |

* cited by examiner

EXTENDABLE AND RETRACTABLE CONVEYOR

CROSS-REFERENCE TO RELATED APPLICATIONS

This application claims priority from U.S. Provisional Patent Application 63/242,606 filed Sep. 10, 2021.

TECHNICAL FIELD

The present invention relates generally to material-conveying systems and, more particularly, to agricultural material-conveying systems.

BACKGROUND

In the agricultural industry, various types of conveyors are used to transport grain, seed, fertilizer and other such bulk materials. Belt conveyors are particularly well suited to conveying cereal, oil seeds, rice, flours, seeds and other delicate products.

Maneuvering the conveyor is frequently necessary in order to position the conveyor relative to a truck and/or storage bin. This task is often awkward and time-consuming, especially when there are nearby obstacles or when the ground is uneven or rutted. Some efforts have been made in the prior art to address this issue. For example, some technologies have been developed to make conveyors more maneuverable such as swing conveyors. However, in some cases, it would be desirable to extend or retract the conveyor to effectively lengthen or shorten the reach of the conveyor.

U.S. Pat. No. 7,946,416 entitled "Retractable Transfer Conveyor" discloses an auger conveyor rotating inside a tube that is supported by a collector housing. The tube has a hole in its bottom to permit material to be discharged into the collector housing. Aside from added weight and complexity, the mechanism has limited adjustability because the hole must be aligned with the collector housing. Furthermore, for delicate products, an auger is unsuitable as it may damage the products. Furthermore, as compared with a belt conveyor, the auger requires more power and has a lower material flow rate for the same size tube.

Canadian Patent 2,398,015 entitled "Telescoping Tube Conveyor" discloses a two telescoping tubes and a take-up mechanism having multiple rollers to take up the slack in the belt when retracted, both of which add weight and complexity. In this telescoping conveyor, the distance between the inlet and outlet is variable (i.e. it is not fixed) because the inlet and outlet are movable relative to each other along the direction of conveyance. Due to the variability in the distance between the inlet and the outlet, a take-up mechanism is required to accommodate the relative movement of the inlet and outlet.

In view of the foregoing, an improved extendable and retractable continuous loop conveyor with a fixed distance between the inlet and outlet is highly desirable in order to address the shortcomings of the prior art. Although an improved continuous loop conveyor is desirable, there are various engineering and design constraints that make it challenging to design an extendable and retractable conveyor that overcomes the issues with the prior art without introducing further issues. Notably, for a belt-in-tube conveyor, the belt is typically made wider than the tube and there is a belt transition zone between the tube and the discharge end to enable the belt to flatten after leaving the tube so that the belt is flat when passing over the drive roller. Furthermore, for a continuous loop conveyor, the discharge must be beyond the drive roller. Since the drive roller rotates about an axis perpendicular to the direction of conveyance, it is necessary that all of the drive components associated with the drive roller be outside of the path of the conveyor, including the conveyor return. In light of these various design constraints, it is challenging to improve on the extendable and retractable continuous loop conveyors of the prior art.

SUMMARY

In general, the present invention is an extendable and retractable conveyor having a belt conveyor, paddle conveyor, chain conveyor or other continuous loop conveyor inside a housing such as a tube. The conveyor has a fixed distance between the inlet and outlet and includes a movable spout that is extendable and retractable relative to the housing. An actuator displaces the movable spout to extend or retract the conveyor.

One aspect of the present invention is an extendable and retractable conveyor that comprises a hopper for receiving agricultural product, a housing, e.g. a tube, having an inlet and an outlet that are separated by a fixed distance, the inlet being adjacent to the hopper for receiving the agricultural product from the hopper. The conveyor includes a belt conveyor, paddle conveyor, chain conveyor or other continuous loop conveyor disposed within the housing for conveying the agricultural product from the inlet to the outlet, the continuous loop conveyor having an upper product-conveying segment defining a direction of conveyance. The continuous loop conveyor has a return segment beneath the product-conveying segment that moves in a direction opposite. The conveyor further includes a hood connected to the outlet for deflecting the agricultural product relative to the direction of conveyance. The conveyor further includes a movable spout that is slidably connected to the housing and disposed beneath the hood to receive the agricultural product from the hood, the movable spout being slidable in a direction parallel to the direction of conveyance to thereby extend or retract the conveyor. The return segment of the continuous loop conveyor passes between the movable spout and the housing.

Another aspect of the present invention is an extendable and retractable conveyor comprising a hopper for receiving agricultural product and a housing, such as for example a tube, having an inlet for receiving the agricultural product from the hopper. A belt conveyor, paddle conveyor, chain conveyor or other continuous loop conveyor is disposed within the housing for conveying the agricultural product from the inlet to an outlet. The inlet and outlet are separated by a fixed distance. A hood is connected to the outlet. The conveyor includes a movable spout suspended beneath the hood to receive the agricultural product from the hood, the movable spout being slidable to thereby extend or retract the conveyor. A return segment of the continuous loop conveyor passes between the movable spout and the housing.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
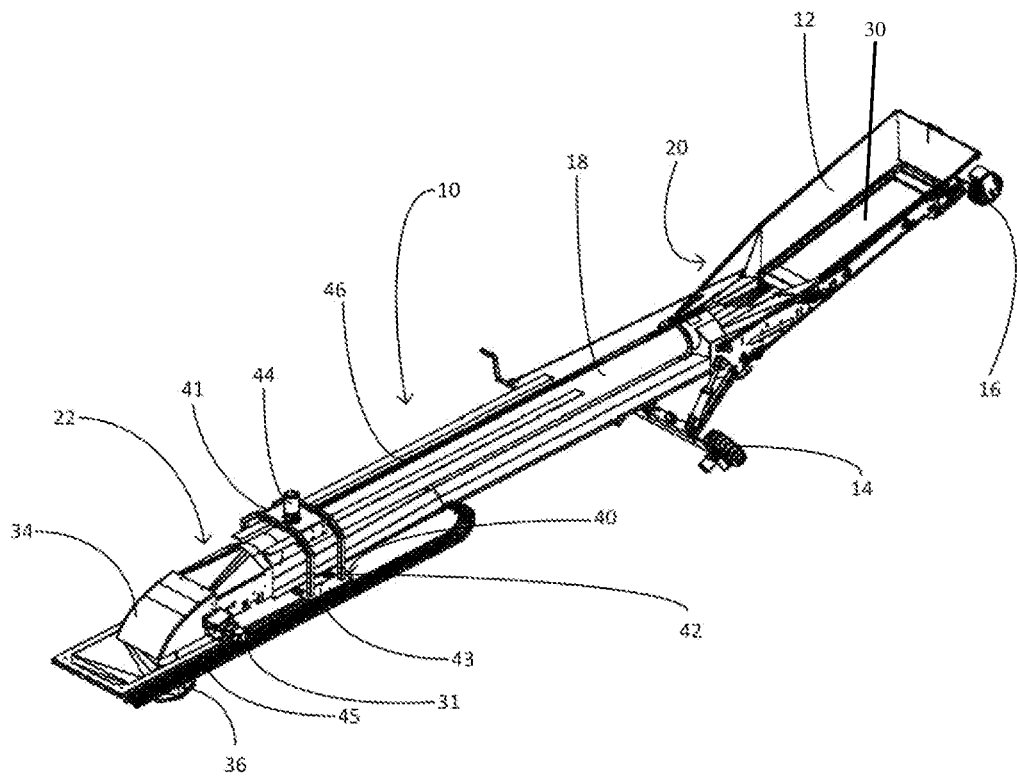
FIG. 1 is a perspective view of an extendable and retractable conveyor in accordance with an embodiment of the invention.
Figure 2:
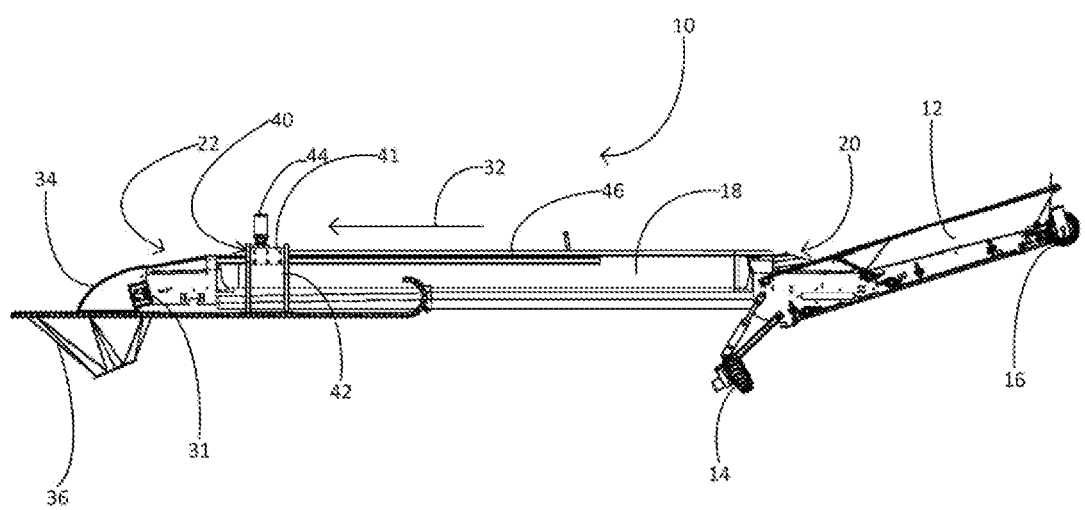
FIG. 2 is a side view of the extendable and retractable conveyor of FIG. 1, showing the movable spout in an extended position.

FIGS. 1 and 2 depict an extendable and retractable conveyor generally denoted by reference numeral 10. The extendable and retractable conveyor (also referred to herein simply as the conveyor) includes a hopper 12 for receiving agricultural product. The agricultural product may be seeds, oil seeds, cereal, rice, flours, or any other similar products. As shown, the hopper 12 has a first wheel 14 and a second wheel 16. The first wheel 14 may be a drive wheel.

The conveyor illustrated in FIGS. 1 and 2 includes a housing 18 (e.g. a tube or other equivalent enclosure of any suitable cross-sectional shape) having an inlet 20 and an outlet 22. The housing 18, e.g. the tube illustrated in this particular embodiment, also has a top 24, a side 26 and a bottom 28. The inlet 20 is adjacent to the hopper 12 for receiving the agricultural product from the hopper. In the illustrated embodiment, the housing has a solid structure having no holes or apertures along its lateral surface (e.g. its cylindrical surface in the case of a tube). The only holes in the housing are the inlet and the outlet.

The conveyor 10 includes a belt conveyor 30, or alternatively a paddle conveyor (cleated conveyor), chain conveyor or other continuous loop conveyor. In the illustrated example, the conveyor is a belt conveyor having a belt disposed within a tube acting as the housing 18 for conveying the agricultural product from the inlet 20 to the outlet 22. The inlet 20 and the outlet 22 are separated by a fixed distance. The conveyor has a top roller (or top pulley) and a bottom roller (or bottom pulley) around which the belt is looped. The top roller (top pulley) and the bottom roller (bottom pulley) are also separated by a fixed distance. Accordingly, the conveyor does not require a take-up mechanism to accommodate the movement of the outlet with respect to the inlet. The absence of a take-up mechanism is a significant advantage, minimizing weight, saving energy and avoiding mechanical complexity. In some embodiments, the conveyor may have adjustable top and/or bottom rollers for adjusting the tracking and tension of the belt to account for belt stretch. It is to be understood that the conveyor is still to be considered a fixed-length conveyor because the inlet and outlet remain at a fixed distance even if there is a tiny adjustment in the distance between the rollers to accommodate for belt stretch. In other words, in a fixed-length conveyor, even if there is a tiny linear adjustment that changes the distance between the rollers for the purposes of tracking or tension, the distance between the inlet and the outlet does not change, unlike a telescopic conveyor. Adjustment for tracking and tension does not change the fact that the conveyor is still fundamentally a fixed-length conveyor. The belt conveyor has an upper product-conveying segment that defines a direction of conveyance (denoted by arrow 32) which is the prevalent direction in which the agricultural product moves as it is conveyed along the belt conveyor from the inlet to the outlet. The belt conveyor or other continuous loop conveyor has a return segment beneath the upper product-conveying segment that moves in a return direction that is opposite to the direction of conveyance of the product-conveying segment. The belt conveyor includes a taut (tensioned) belt made of a suitable polymer, fabric or other material that is driven by a belt drive motor 31, e.g. a hydraulic motor coupled to a drive pulley. The belt may be supported by drums or idler rollers.

In the illustrated embodiment, in the specific case of a belt-in-tube conveyor (i.e. a belt conveyor), the conveyor has an inlet-side transition between the hopper and the inlet of the tube where the belt goes from flat to curved. Analogously, the conveyor has an outlet-side transition from the outlet of the tube to the spout or discharge where the belt goes from curved to flat. When flattened, the belt is thus wider than the tube in which it travels. As a consequence of the belt flattening and widening as it leaves the outlet of the tube into the outlet-side transition, the drive roller and belt return require a greater width to enable the belt to pass flat over the drive roller and belt return. This constraint is taken into account in the design of the extension/retraction mechanism of the present conveyor. The design of the extension/retraction mechanism of the present conveyor disclosed herein addresses this and other constraints mentioned above. It is noteworthy that the presence of a return segment of the continuous loop conveyor, unlike an auger or screw conveyor, which can be readily supported from beneath, is a key design constraint which must be taken into account in designing the extension/retraction mechanism.

The conveyor 10 includes a hood 34 connected to the outlet 22 for deflecting the agricultural product relative to the direction of conveyance.

The conveyor 10 further includes a movable spout 36 that is slidably connected to the tube (housing 18) and disposed beneath the hood 34 to receive the agricultural product from the hood. The movable spout 36 is slidable in a direction parallel to the direction of conveyance to thereby extend or retract the conveyor. The return segment of the belt conveyor passes between the movable spout 36 and the housing 18. There is a small gap 38 between the spout and the hood. The movable spout 36 is tapered in a flow direction and thus acts generally like a funnel to direct the agricultural product into a bin, container or other receptacle placed beneath the spout. In the illustrated embodiment, the movable spout 36 is movable to a position beyond the outlet, the transition and the drive roller, so as to be positioned beneath the hood. In other words, the movable spout is slidably connected to the tube so as to enable the movable spout to extend past the outlet-side transition and past the drive roller in order to receive the product discharged from the hood. In a continuous loop conveyor (unlike an auger or screw conveyor), a return is required, which necessarily must run below the housing (e.g. tube). The product must be discharged through the end of the housing (i.e. through the outlet into a hood), and not through the bottom of the housing like an auger conveyor.

The conveyor 10 also includes a slidable carriage 40 to which the movable spout 36 is mounted. The slidable carriage 40 is configured to slide relative to the tube 18 to move the movable spout 36.

The conveyor 10 also includes a drive mechanism, e.g. a hydraulic drive or equivalent, connected to the slidable carriage 40 to displace the slidable carriage and the movable spout. The drive mechanism includes an actuator (such as a linear actuator, motor, etc.) that is connected at a first end to the housing and at a second end to the slidable carriage to displace the slidable carriage and the movable spout relative to the housing. In one embodiment, as illustrated by way of example, the hydraulic drive includes a hydraulic drive motor 44 that drives the slidable carriage along an upper drive track 46 disposed along the tube. Alternatively, the hydraulic drive motor 44 may be replaced with any other suitable type of actuator such as an electric motor, hydraulic cylinder, pneumatic cylinder, or equivalent to slidably displace the slidable carriage 40. The actuator may be a linear actuator or a rotary-type actuator (such as a motor). The actuator may be hydraulic, pneumatic or electric.

The slidable carriage 40 as shown in FIGS. 1 and 2 includes an upper support member 41 that supports the hydraulic drive motor 44. Connected to the upper support 41 are a plurality of legs 42 extending downwardly to a lower plate 43. The lower plate 43 is connected to a cantilevered spout-supporting member 45 that rigidly supports the spout 36 in a cantilevered manner beneath the hood 22. In the illustrated embodiment, the cantilevered spout-support member 45 is attached to one side of the lower plate 43 as shown in FIGS. 1 and 2 and attaches to one side of an upper rim of the spout.

In one embodiment, the hydraulic drive motor and the drive track are mounted on a top of the tube.

In another embodiment, the hydraulic drive motor and the drive track are mounted on a side of the tube.

In the embodiment shown in FIGS. 1 and 2, a roller track (e.g. a roller composed of a plurality of hex-axle rollers or equivalent) may optionally be provided to enable a hydraulic hose to be displaced while connected to the hydraulic drive motor when the movable spout is extended or retracted.

The conveyor 10 may have guide rails extending along the sides of the tube. The slidable carriage has sliders or rollers configured to slide or roll in the guide rails to displace the slidable carriage relative to the tube. In an alternative mechanism, the sliders or rollers may be configured to slide over the guide rails.

Although the conveyor illustrated FIGS. 1 and 2 has a tube as a housing and a hydraulic drive motor, it will be appreciated that the housing may have another shape (other than a tube). Also, the drive mechanism need not use a hydraulic drive motor. Instead, the drive mechanism may include an electric motor, a linear actuator (hydraulic, electric, pneumatic), or other suitable mechanism.

Figure 3:
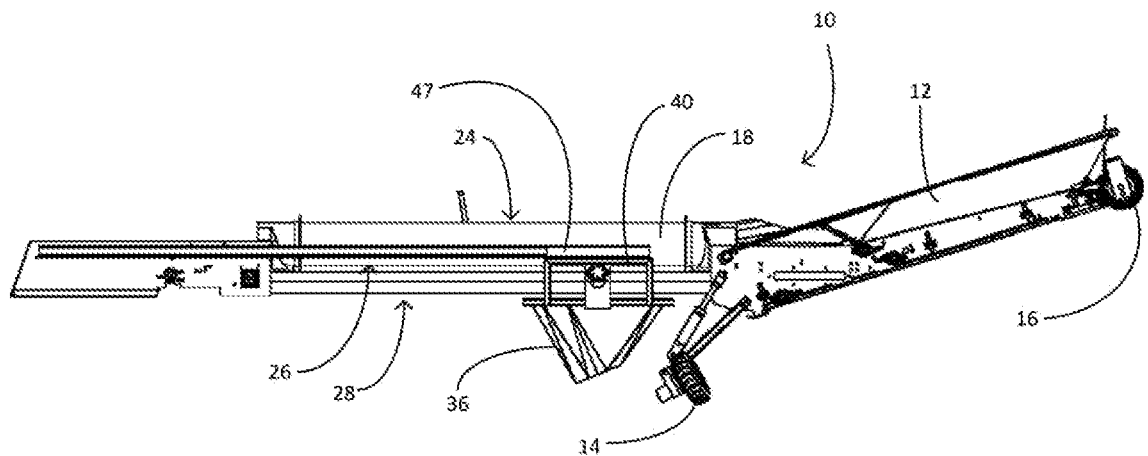
FIG. 3 is a side view of the extendable and retractable conveyor in accordance with another embodiment.
Figure 4:
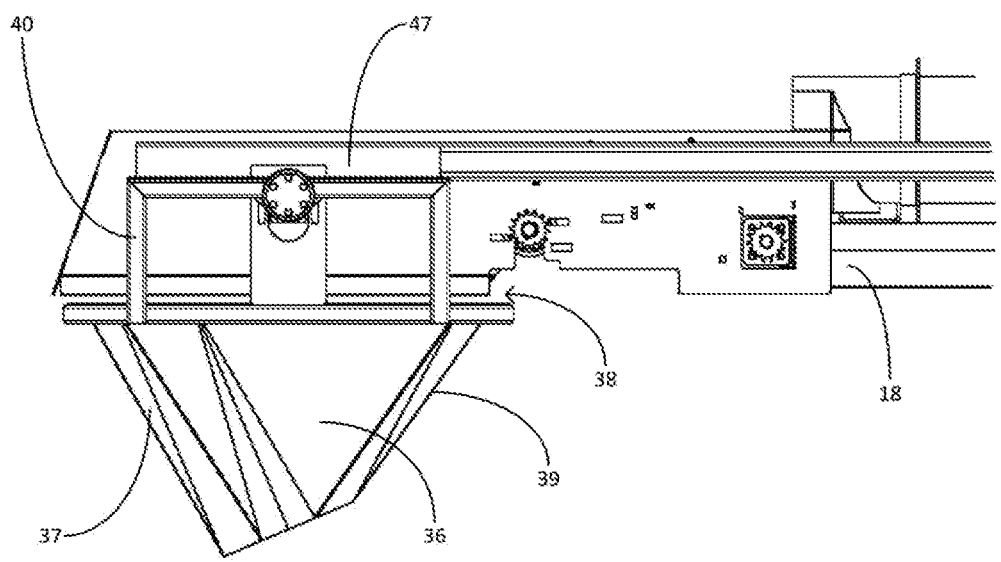
FIG. 4 is a side view of the discharge end of the extendable and retractable conveyor of FIG. 3 showing the movable spout near the discharge end.

In another embodiment, as illustrated in FIGS. 3 and 4, movable spout 36 is suspended beneath the slidable carriage 40. In this embodiment, as shown by way of example in FIGS. 3 and 4, the movable spout 36 comprises a forward wall 37 slanted at a first angle and a rearward wall 39 slanted at a second angle, wherein the first and second angles are different. The forward and rearward walls converge in a downward direction, i.e. in a product flow direction. As illustrated by way of example in FIG. 3, the upper portion of the slidable carriage 40 includes a sliding member referred to herein as a slider 47 that slides in a slot or groove. In this example, the slider 47 is a rectangular slider. In this particular implementation, as illustrated by way of example, the slider 47 is an elongated block that slidingly fits into a C-shaped channel. As shown the C-shaped channel extends longitudinally along the tube i.e. along the housing 18. In this implementation, the slider 47 is made of urethane although it may also be made of any mechanically equivalent material.

Figure 7:
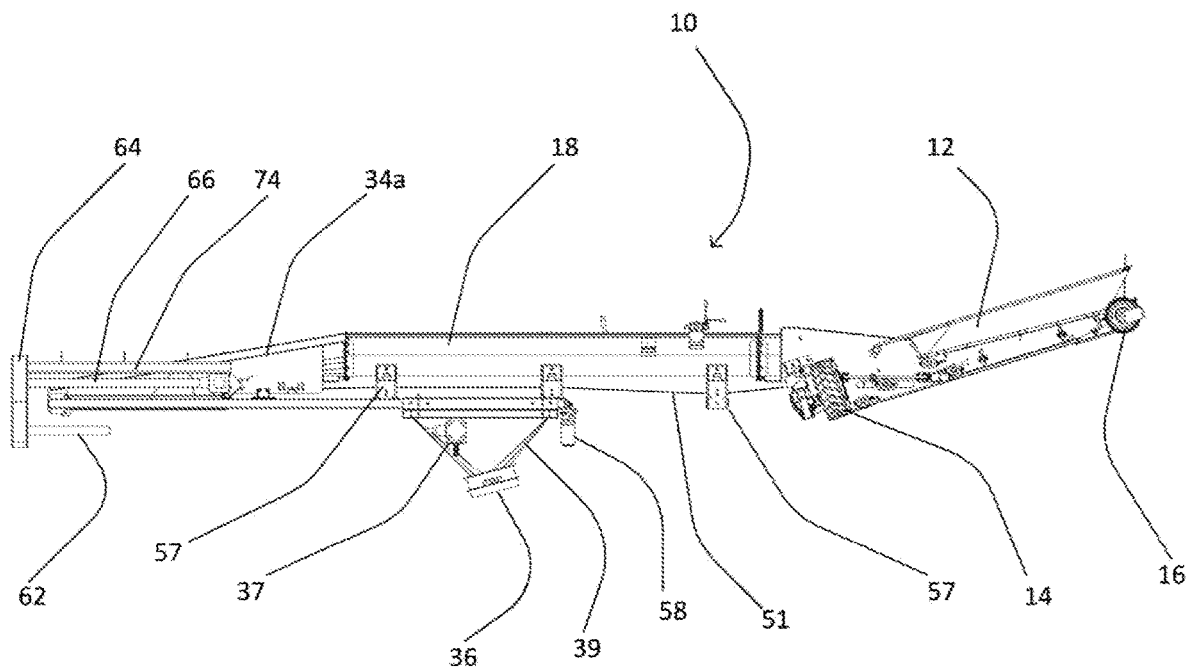
FIG. 7 is a side view of the extendable and retractable conveyor of FIG. 5 showing the movable spout in a retracted position.
Figure 8:
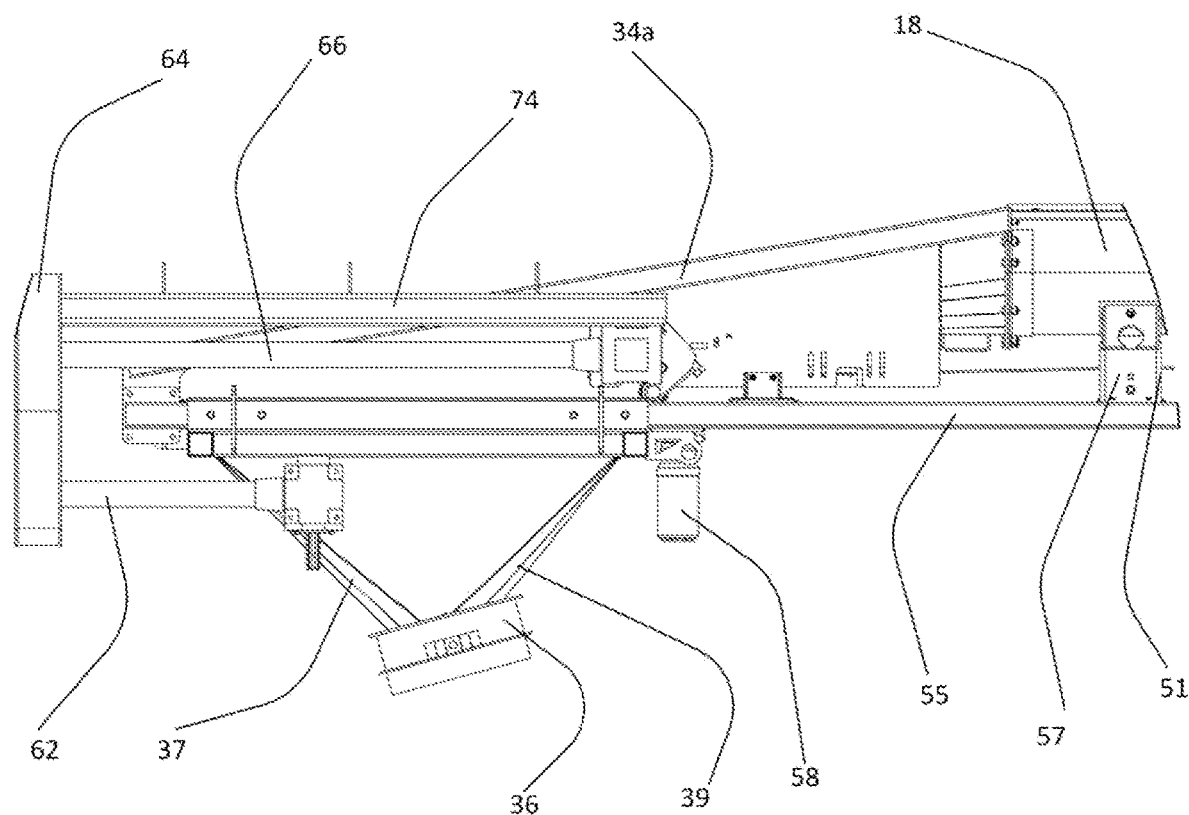
FIG. 8 is an enlarged side view of the discharge end of the extendable and retractable conveyor of FIG. 6.
Figures 9, 10:
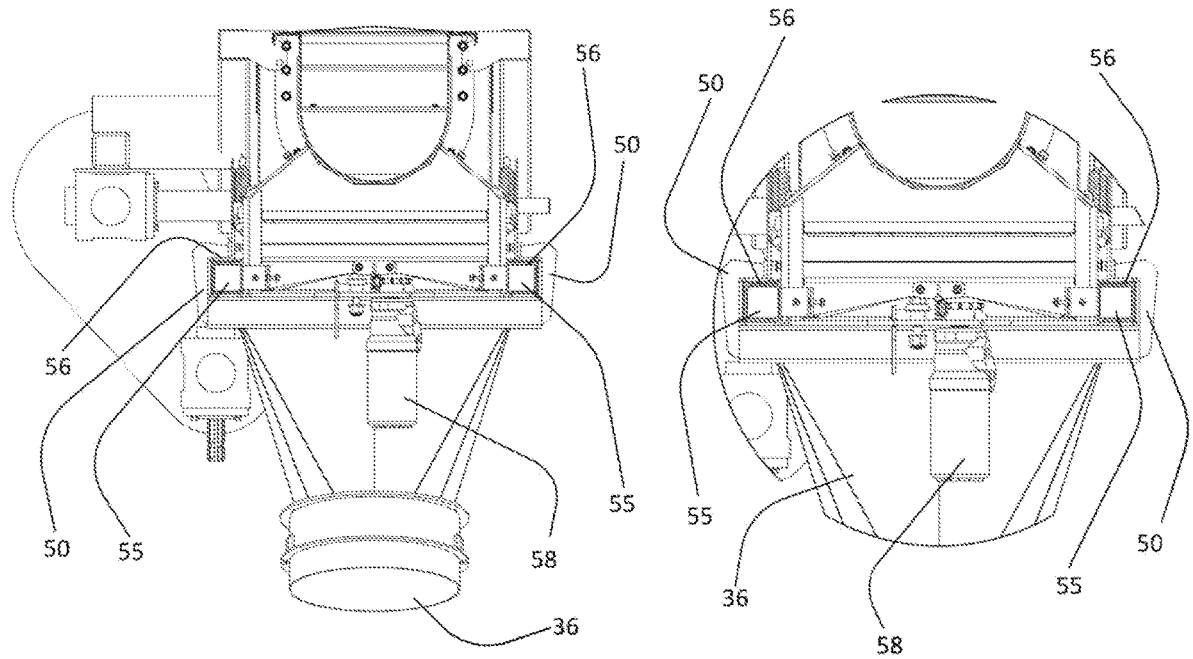
FIG. 9 is a cross-sectional view of the extendable and retractable conveyor of FIG. 5.
FIG. 10 is an enlarged cross-sectional view of the extendable and retractable conveyor of FIG. 5.
Figure 11:
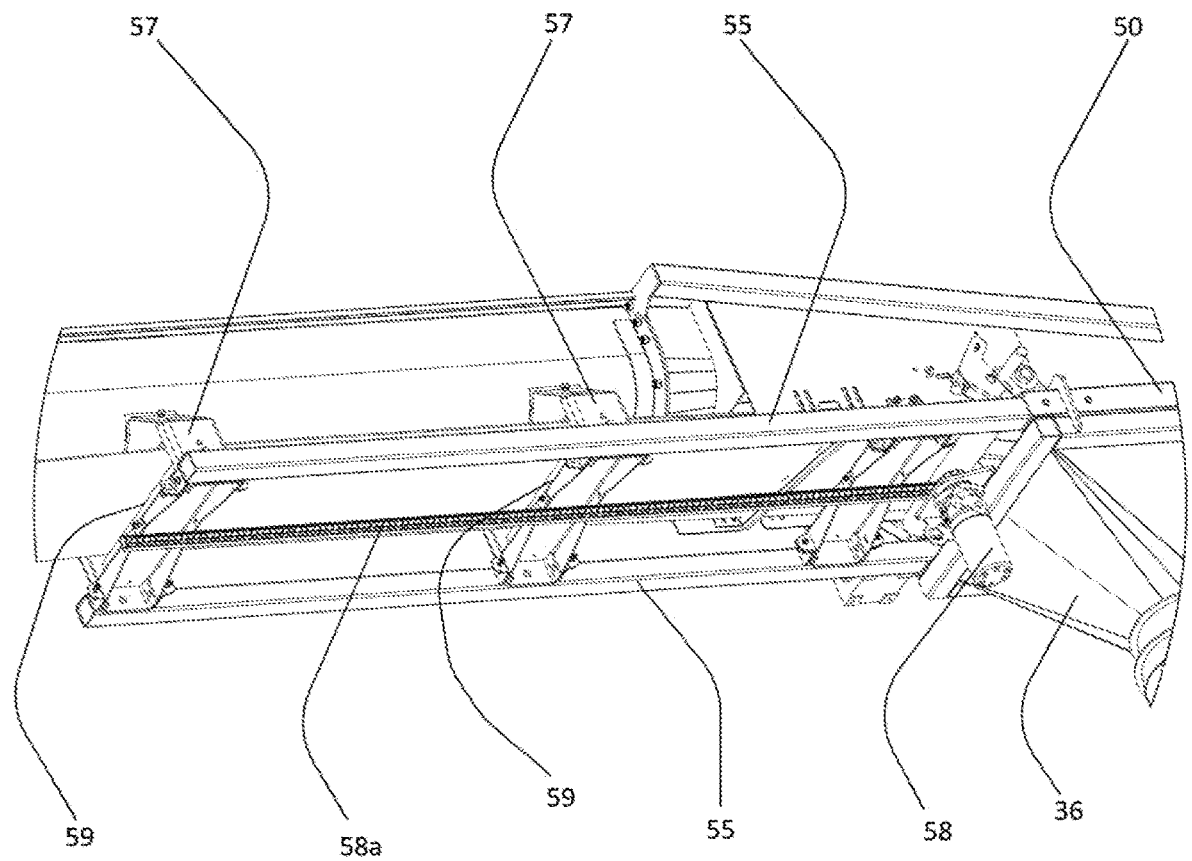
FIG. 11 is a perspective underside view of a portion of the extendable and retractable conveyor.

In a further embodiment, which is illustrated by way of example in FIGS. 5-11, the extendable and retractable conveyor 10 has a hopper 12, first and second wheels 14, 16, a housing 18, an outlet transition section 34a and a movable spout 36 that is movable forward and rearward (in a direction parallel to, and aligned with, the direction of conveyance of the belt conveyor), i.e. the movable spout can be extended (moved forward as shown for example in FIGS. 5, 6 and 8) or retracted (moved rearward as shown for example in FIG. 7). Note that the hood is not illustrated in FIGS. 5-11 but would be connected to the downstream end of the outlet transition section 34a. The movable spout 36 comprises a forward wall 37 slanted at a first angle and a rearward wall 39 slanted at a second angle. The first and second angles are different in the illustrated embodiment. The forward and rearward walls converge in a downward direction, i.e. in a product flow direction. The movable spout 36 of the extendable and retractable conveyor 10 depicted in FIGS. 5-8 has a pair of U-shaped channels 50 that are sized and shaped to slide over a respective pair of rails 55 in order to enable the movable spout 36 to slide forward or rearward, i.e. to extend or retract. The rails 55 are supported by rail-support members or hangers 57 that attach to the side of the housing 18. The rails are spread wider than a width of the return segment of the belt 51. Optionally, a plastic liner 56 is installed into the U-shaped channels to reduce sliding friction between the channels and rails. A motor 58 is provided to power the movable spout, i.e. to drive the movable spout over the rails 55. The motor may have a drive sprocket that meshes with a chain 58a (shown in FIG. 11) to move the movable spout. The motor 58 may be a hydraulic motor, for example, although it could also be any other type of motor or linear or rotary actuator, e.g. electric, hydraulic, pneumatic, etc. As depicted by way of example in FIG. 11, the rail-support members or hangers 57 may optionally include rollers 59 over which the return segment of belt rolls.

Figure 5:
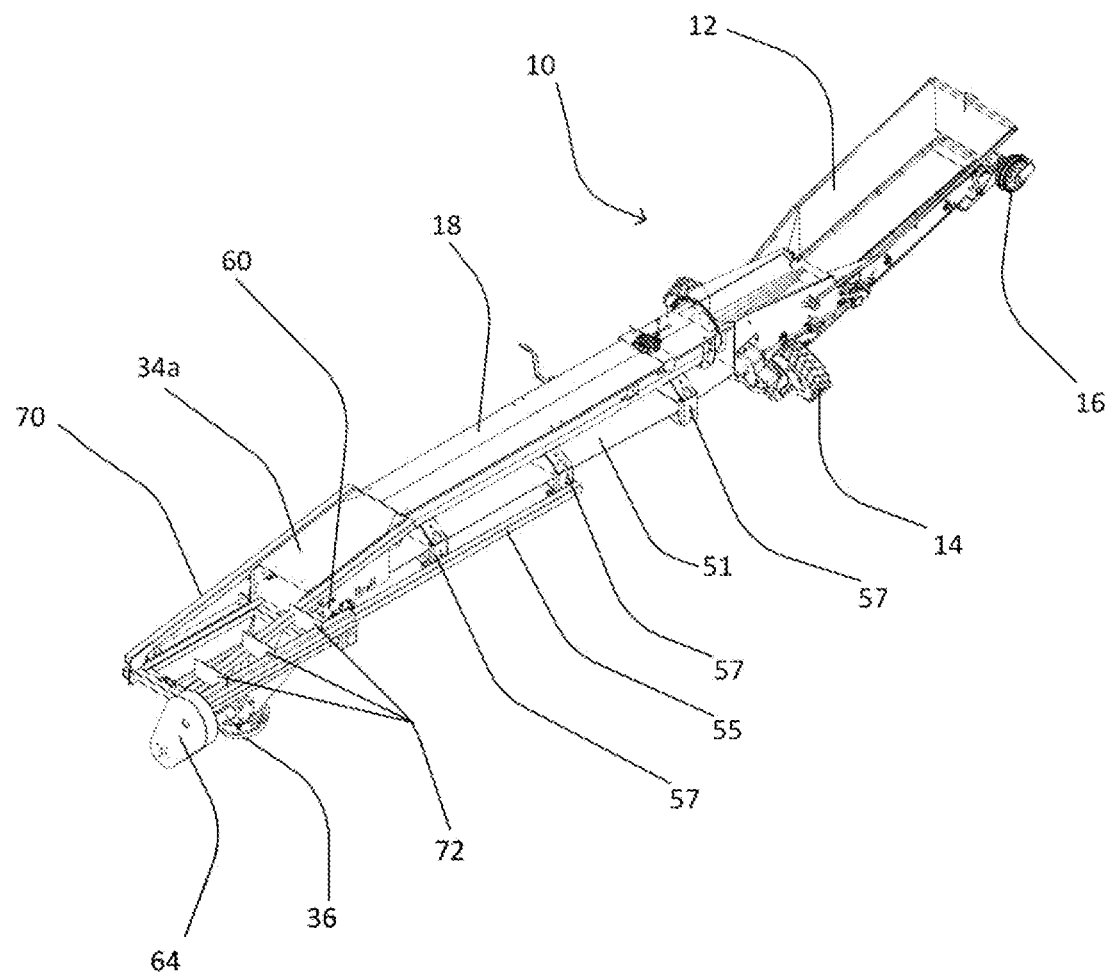
FIG. 5 is a perspective view of an extendable and retractable conveyor in accordance with a further embodiment of the invention.
Figure 6:
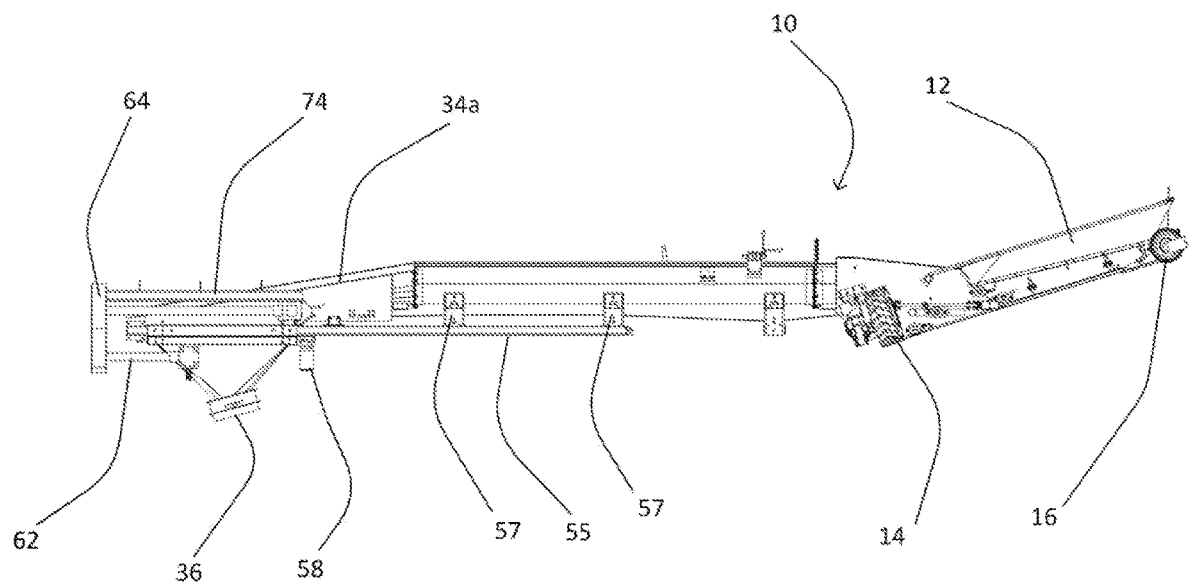
FIG. 6 is a side view of the extendable and retractable conveyor of FIG. 5 showing the movable spout in an extended position.
Figure 12:
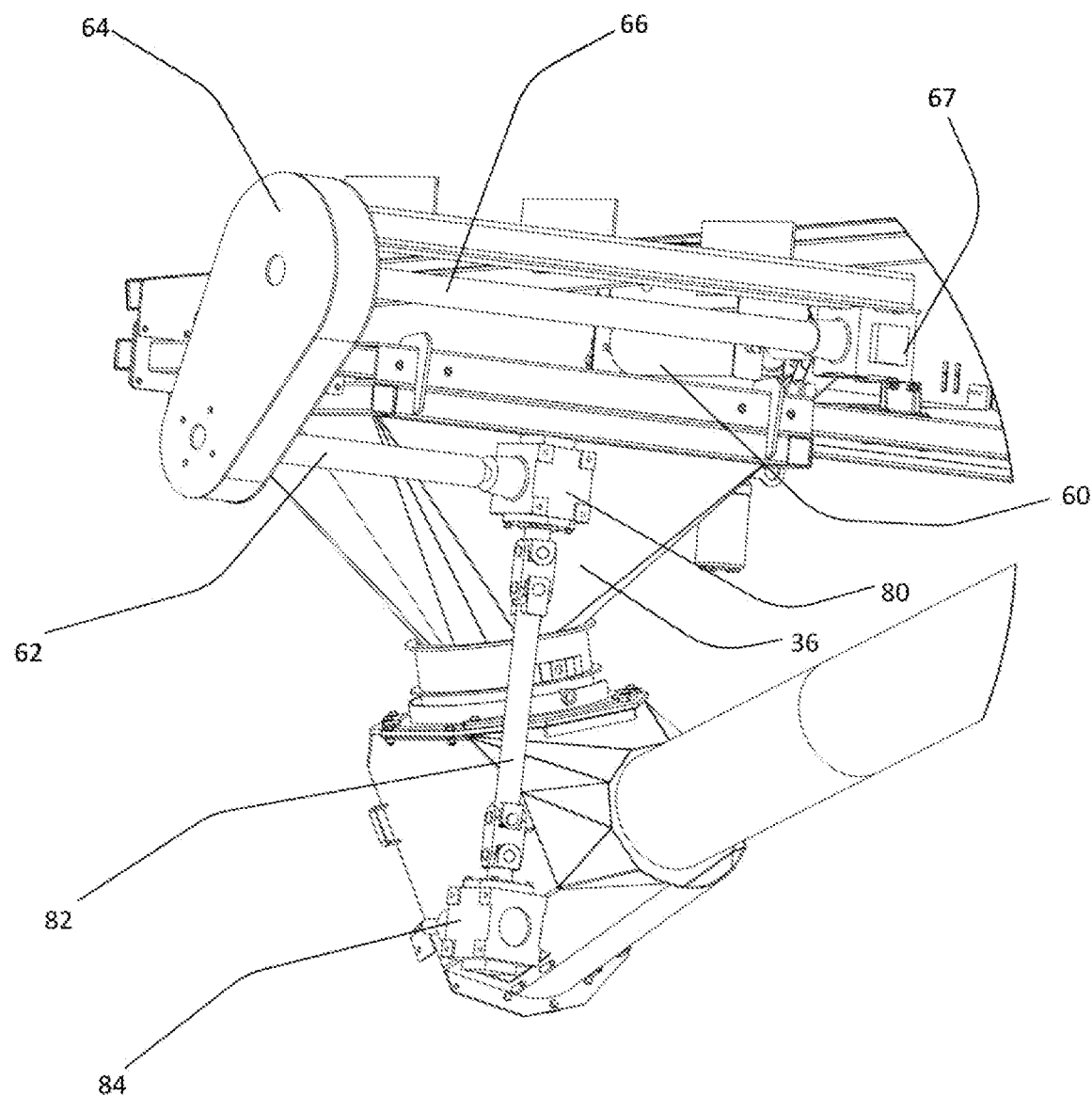
FIG. 12 is a perspective view of a portion of the extendable and retractable conveyor showing how the input shaft of the power transmission unit can be connected to the drive shaft of a PTO.
Figure 13:
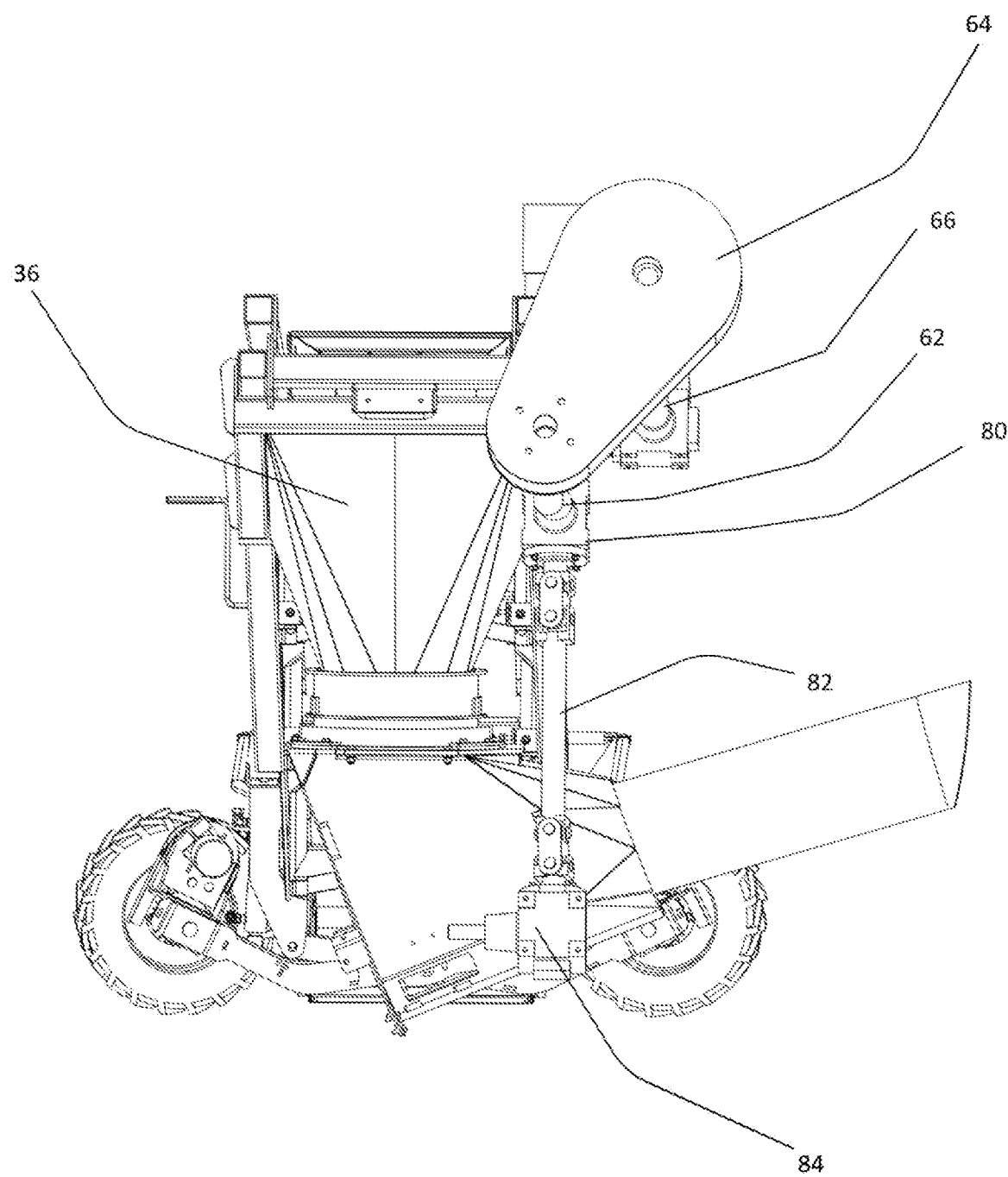
FIG. 13 is a front view of a portion of the extendable and retractable conveyor showing how the input shaft of the power transmission unit can be connected to the drive shaft of a PTO.

As further illustrated in FIGS. 5-11, the belt conveyor can be driven by a drive pulley 60, drum, drive roller or equivalent rotary component (shown specifically in FIG. 5). The drive pulley 60 (or drive roller) may be driven by a power take-off (PTO) of a tractor or other such vehicle or power source. Alternatively, the drive pulley 60 may be driven by a hydraulic motor, electric motor or any other suitable prime mover as shown in FIGS. 12-13. In the embodiment depicted in FIGS. 12-13, the input shaft 66 is connected to a gearbox 67 which is connected to the drive pulley 60. The gearbox 67 enables the driveshaft 66 to run parallel to the direction of conveyance, and perpendicular to the drive pulley 60 as shown in FIG. 12. In the specific example of a PTO, the PTO drive shaft is connected via any suitable articulated mechanical linkages (e.g. having U-joints) to an input shaft 62 of a power transmission unit 64. The input shaft 62 in one embodiment is a telescoping input shaft. In one specific embodiment, which is designed to operate with a PTO drive shaft, the input shaft 62 telescopes approximately 18 inches of working range or, alternatively between 16-20 inches, allowing the conveyor to operate while sliding the movable spout approximately 18 inches (or alternatively between 16-20 inches). When the movable spout moves beyond this range (e.g., to the position shown in FIG. 7), the shaft (which can be a splined shaft in this embodiment) disengages so power can no longer be transmitted to the drive pulley/roller 60. The power transmission unit 64 has a housing enclosing a chain-and-sprocket mechanism to transmit power to an output shaft 66 that connects to the drive pulley 60. The power transmission unit 64 may alternatively be a reduction gearbox or belt-and-pulley mechanism to reduce rotational speed while increasing torque. The power transmission unit 64 is mounted to a frame 70 by a plurality of support members 72 and a support shaft 74. In the embodiment illustrated by way of example in FIGS. 5-11, the input shaft is parallel to, and spaced apart from, the output shaft. In the embodiment illustrated by way of example in FIGS. 5-11, the input shaft and the output shaft are aligned with the direction of conveyance. This mechanical arrangement enables the drive pulley 60 to be driven from the side.

As depicted by way of example in FIGS. 12-13, the input shaft 62 is connectable to a first gearbox 80 which connects to a power transmission shaft 82 (having two universal joints) which in turn connects to a second gearbox 84 that can be connected to the PTO. This is merely one illustration of how the input shaft can be mechanically coupled to a PTO and it will be appreciated that various other mechanical linkages and geometries can be substituted or employed.

Although the extendable and retractable conveyor is illustrated in the figures as a belt conveyor, the extendable and retractable conveyor may be a paddle conveyor (cleated conveyor) or a chain conveyor. The conveyor may be any suitable continuous loop conveyor. For greater clarity, it is to be understood that a continuous loop conveyor for the purposes of this specification is intended to exclude an auger or screw conveyor.

Optionally, the conveyor may include a control system to automatically limit the linear motion of the slidable carriage and movable spout. The control system may include position sensors, limit switches or equivalent to provide feedback signals to a microprocessor or microcontroller of the control system to enable the control system to stop the slidable carriage and movable spout when it has reached a predetermined position.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed herein. The scope of the exclusive right sought by the applicant(s) is therefore intended to be limited solely by the appended claims.

The invention claimed is:
1. An extendable and retractable conveyor comprising:
a hopper for receiving agricultural product;
a housing having an inlet and an outlet that are separated by a fixed distance, the inlet being adjacent to the hopper for receiving the agricultural product from the hopper;
a continuous loop conveyor disposed within the housing for conveying the agricultural product from the inlet to the outlet, the continuous loop conveyor having an upper product-conveying segment defining a direction of conveyance and a return segment beneath the upper product-conveying segment moving opposite to the direction of conveyance;
a hood connected to the outlet for deflecting the agricultural product relative to the direction of conveyance; and
a movable spout that is slidably connected to the housing and disposed beneath the hood to receive the agricultural product from the hood, the movable spout being slidable in a direction parallel to the direction of conveyance to thereby extend or retract the conveyor, and wherein the return segment passes between the movable spout and the housing.

2. The extendable and retractable conveyor of claim 1 comprising a slidable carriage to which the movable spout is mounted, the slidable carriage being configured to slide relative to the housing to move the movable spout.

3. The extendable and retractable conveyor of claim 2 comprising guide rails extending along the sides of the housing.

4. The extendable and retractable conveyor of claim 3 wherein the slidable carriage comprises sliders or rollers configured to slide or roll in the guide rails to displace the slidable carriage relative to the housing.

5. The extendable and retractable conveyor of claim 2 comprising a drive mechanism connected to the slidable carriage to displace the slidable carriage and the movable spout relative to the housing.

6. The extendable and retractable conveyor of claim 5 wherein the drive mechanism comprises a drive motor and drive track that drives the slidable carriage along the housing.

7. The extendable and retractable conveyor of claim 6 wherein the drive motor and the drive track are mounted on a top of the housing.

8. The extendable and retractable conveyor of claim 6 wherein the drive motor and the drive track are mounted on a side of the housing.

9. The extendable and retractable conveyor of claim 5 wherein the drive mechanism comprises a linear actuator that drives the slidable carriage along the housing.

10. The extendable and retractable conveyor of claim 1 wherein the movable spout comprises a forward wall slanted at a first angle and a rearward wall slanted at a second angle, wherein the first and second angles are different.

11. The extendable and retractable conveyor of claim 1 wherein the movable spout includes U-shaped channels for sliding over respective rails secured by hangers to the housing.

12. The extendable and retractable conveyor of claim 1 comprising an input shaft connectable to a PTO of a tractor and a power transmission unit for transmitting power to an output shaft that connects to a drive pulley of the continuous loop conveyor.

13. The extendable and retractable conveyor of claim 12 wherein the input shaft is parallel to a direction of conveyance.

14. The extendable and retractable conveyor of claim 2 comprising a motor to displace the slidable carriage, wherein the motor is disposed beneath the housing.

15. An extendable and retractable conveyor comprising:
a hopper for receiving agricultural product;
a housing having an inlet for receiving the agricultural product from the hopper;
a continuous loop conveyor disposed within the housing for conveying the agricultural product from the inlet to an outlet, wherein the inlet and the outlet are separated by a fixed distance;
a hood connected to the outlet; and
a movable spout suspended beneath the hood to receive the agricultural product from the hood, the movable spout being slidable to thereby extend or retract the conveyor, wherein a return segment of the continuous loop conveyor passes between the movable spout and the housing.

16. The extendable and retractable conveyor of claim 15 comprising a slidable carriage that suspends the movable spout beneath the hood.

17. The extendable and retractable conveyor of claim 16 comprising guide rails extending along the sides of the housing.

18. The extendable and retractable conveyor of claim 17 wherein the slidable carriage comprises sliders or rollers configured to slide or roll in the guide rails to displace the slidable carriage relative to the housing.

19. The extendable and retractable conveyor of claim 16 comprising a drive mechanism connected to the slidable carriage to displace the slidable carriage and the movable spout relative to the housing.

20. The extendable and retractable conveyor of claim 19 wherein the drive mechanism comprises a drive motor and drive track that drives the slidable carriage along the housing.

21. The extendable and retractable conveyor of claim 20 wherein the drive motor and the drive track are mounted on a top of the housing.

22. The extendable and retractable conveyor of claim 20 wherein the drive motor and the drive track are mounted on a side of the housing.

23. The extendable and retractable conveyor of claim 19 wherein the drive mechanism comprises a linear actuator that drives the slidable carriage along the housing.

24. The extendable and retractable conveyor of claim 15 wherein the movable spout comprises a forward wall slanted at a first angle and a rearward wall slanted at a second angle, wherein the first and second angles are different.

25. The extendable and retractable conveyor of claim 15 wherein the movable spout includes U-shaped channels for sliding over respective rails secured by hangers to the housing.

26. The extendable and retractable conveyor of claim 15 comprising an input shaft connectable to a PTO of a tractor and a power transmission unit for transmitting power to an output shaft that connects to a drive pulley of the continuous loop conveyor.

27. The extendable and retractable conveyor of claim 26 wherein the input shaft is parallel to a direction of conveyance.

28. The extendable and retractable conveyor of claim 16 comprising a motor to displace the slidable carriage, wherein the motor is disposed beneath the housing.

* * * * *